April 1, 1930. G. A. LUECK 1,752,749
HEATING AND HUMIDIFYING SYSTEM FOR FOOD CARTS
Filed Sept. 27, 1928 2 Sheets-Sheet 1
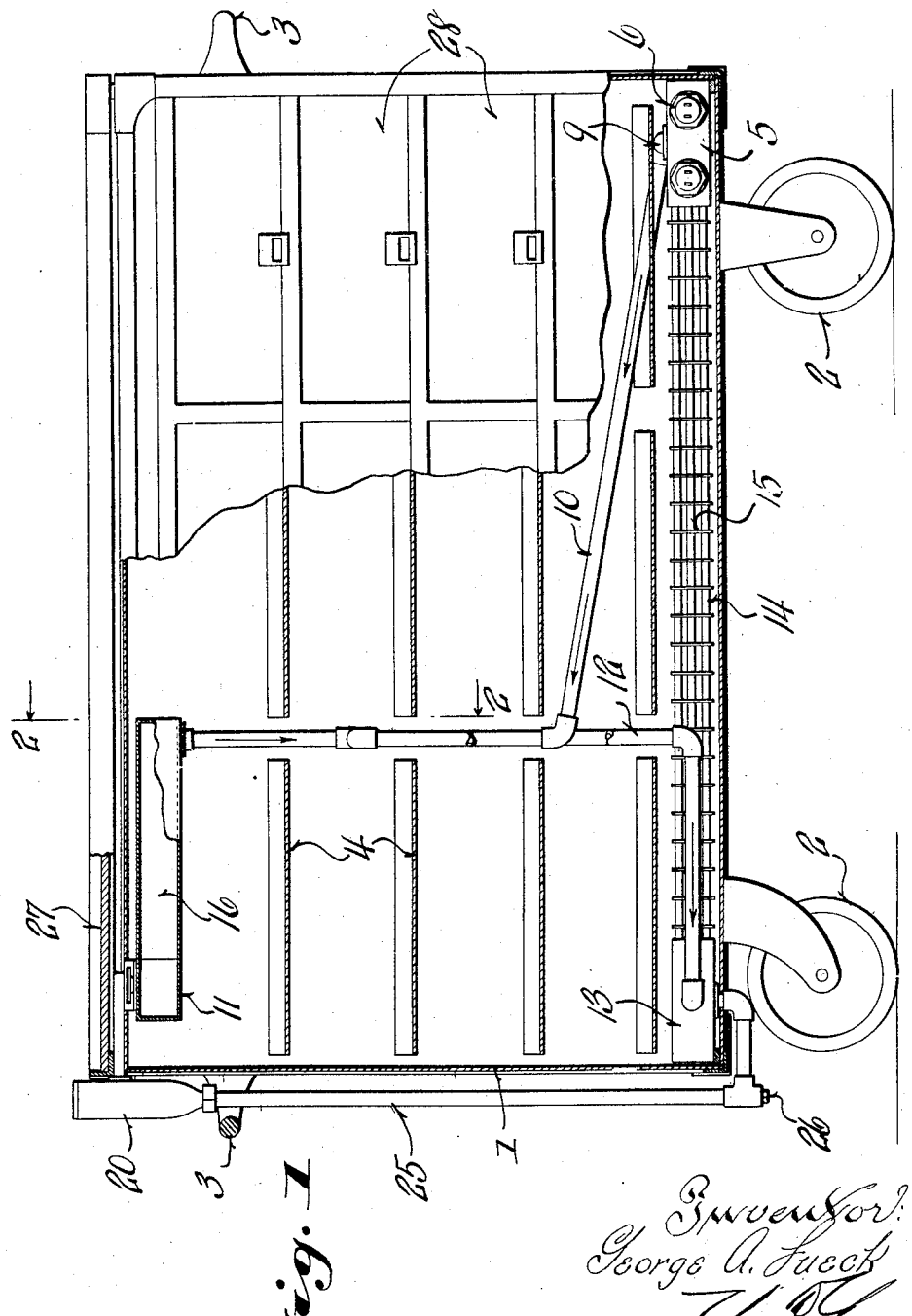

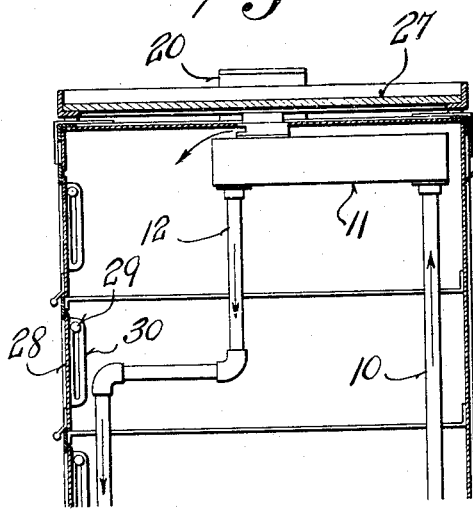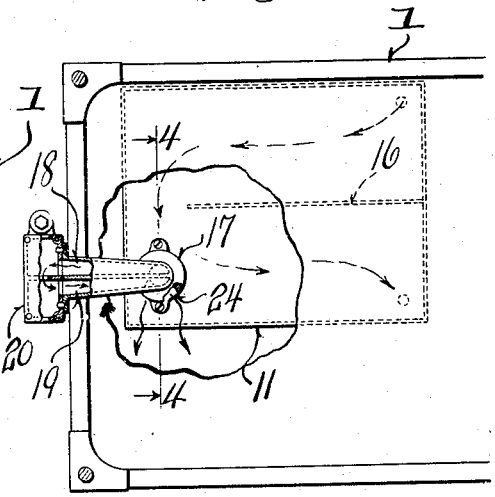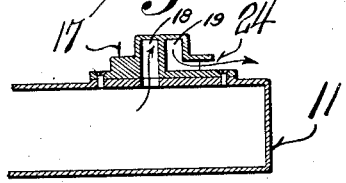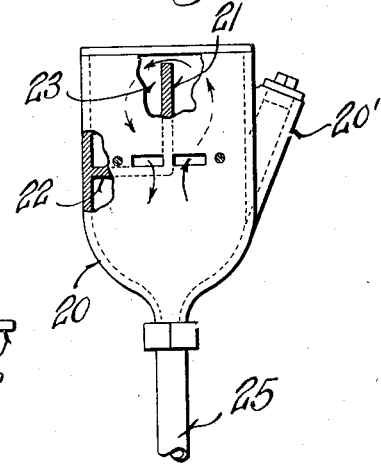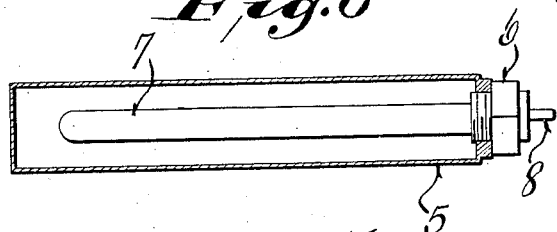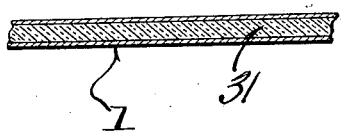

Patented Apr. 1, 1930

1,752,749

UNITED STATES PATENT OFFICE

GEORGE A. LUECK, OF MILWAUKEE, WISCONSIN

HEATING AND HUMIDIFYING SYSTEM FOR FOOD CARTS

Application filed September 27, 1928. Serial No. 308,631.

This invention relates to a heating and humidifying system for food carts.

In hospitals, it is desirable to provide means for serving hot food to patients and to provide a simple means for heating the cart or portable member which carries the food and for storing the heat within the member.

This invention is designed to provide a heating and humidifying system for food carts for hospitals, which is so constructed that a large amount of heat may be stored within the device, and in which a large amount of heat is stored in the circulating medium and is gradually given off in the lower portion of the device, to thus heat the contents of the cart and maintain approximately the temperature within the cart for a considerable length of time.

Further objects are to provide a simple means of humidifying the air within the cart so that drying of the food will not occur, although it may remain in the cart for a considerable length of time.

Further objects are to provide a heating system for a food cart which will readily and rapidly heat the contents of the cart, which may be, therefore, quickly put into service by merely connecting the electric heaters with a suitable source of current.

Further objects are to provide a construction which is relatively simple and may be easily followed.

An embodiment of the invention is shown in the accompanying drawings in which:

Figure 1 is a side elevation partly in section of the cart showing the system in place, with parts broken away;

Figure 2 is a sectional view on the line 2—2 of Figure 1;

Figure 3 is a top plan view of one end of the cart with parts broken away;

Figure 4 is a sectional view on the line 4—4 of Figure 3;

Figure 5 is a view of the head which forms a portion of the humidifying and filling apparatus;

Figure 6 is a sectional view through the heating chamber;

Figure 7 is a fragmentary sectional view to an enlarged scale showing the manner in which the walls of the cart are formed.

Referring to the drawings, it will be seen that the device comprises a closed box-like cart 1, supported by wheels 2, in any suitable manner, and preferably provided with manipulating handles 3, so that it may be pushed or rolled into the position desired. Within the cart, a plurality of shelves 4 are positioned in spaced relation with openings between the shelves, as shown in Figure 1, to permit free circulation of air within the cart.

The heating system comprises a heating chamber 5 which is provided with electric heaters. Preferably, a plurality of heaters are employed, such as indicated at 6 in Figures 1 and 6. These heaters 6 are provided with a heating unit 7 which projects into the heating chamber 5, and they are further provided with plugs or prongs 8 adapted to receive a suitable plug. These heating units are bodily removable exteriorly of the cart and may be easily replaced without disturbing other portions of the apparatus.

The heating chamber is provided with a small dome-like fitting 9 (see Figure 1) which connects to the riser or hot water pipe 10. This hot water pipe extends upwardly, as shown in Figure 2, and discharges through the bottom of the upper tank 11. This upper tank has a return pipe 12 located at the same end of the tank as the pipe 10. The return pipe 12 empties into a bottom header 13. From this header, a plurality of pipes 14 extend to the heating chamber 5 and are preferably provided with radiating fins 15. The pipes 14 and the fins 15 thus constitute an extensive radiator for giving off heat within the lower portion of the cart, so as to heat the air at the lowest portion of the cart and allow the heated air to rise and properly heat all of the food carried upon the several shelves. The upper compartment or tank 11 is provided with a baffle plate 16 (see Figure 3) so as to cause the water to circulate from one end of the tank to the other and then back again.

The tank 11 is also connected to a fitting 17 (see Figure 3) which is provided with a pair of passageways 18 and 19. These passageways 18 and 19 open into a humidifier head 20. This humidifier head is provided with a filling neck 20′ and an upwardly extending baffle plate 21 (see Figure 5), and this baffle plate, together with the wall 22, forms a compartment 23. The compartment 23 is in reality in communication with the passageway 19. The passageway 19 opens through an aperture 24 into the interior of the cart, as shown in Figures 3 and 4. The passageway 18 opens into the upper portion of the upper tank 11.

The fitting 17 and the head 20 thus constitute a humidifier and allow the vapor given off by the water to pass to the interior of the cart and to thus maintain the air in a humid condition and prevent drying of the food.

The head 20 is located exteriorly of the cart adjacent one end, as shown in Figure 1. A filling pipe 25 extends downwardly from the bottom of the head 20 and enters the header 13. Preferably, a drain plug 26 is provided at the lowest point in the system for draining the apparatus when needed.

Any suitable construction of cart may be employed; for instance, as shown in Figure 1, an upper tray or top 27 may be provided for temporarily holding dishes or similar articles.

Further, access to the several shelves is provided by means of doors 28 which may, if desired, be carried by pins 29 secured to the body of the cart and cooperating with slotted members 30 carried by the doors. Thus, the doors may be opened and slid inwardly so as to temporarily hold them in open position and permit the free positioning or removal of the food.

The walls 1 may be formed of double thickness, if desired, as shown in Figure 7, and thermal insulation 31 may be interposed between the walls so as to prevent unnecessary loss of heat.

In actual trials of the device, it has been found that the entire contents of the cart can be very quickly heated, as the heat from the water is given off by the surface of the pipes, heaters, headers, etc., and particularly as a large radiating surface is exposed by the bottom radiator. The construction of radiator need not follow the exact construction outlined in detail above, but any suitable type of radiator may be employed in the lower part of the apparatus for connecting the header 13 and the heating chamber 5.

It will also be seen that the apparatus is of relatively simple construction and may be readily produced.

Although the invention has been described in considerable detail, such description is intended as illustrative rather than limiting as the invention may be variously embodied and as the scope of such invention is to be determined as claimed.

I claim:

1. A food cart comprising a portable container having shelves therein and open throughout its interior portion, a heating chamber and a header located in spaced relation within and adjacent the bottom of said container, an upper tank, a riser connecting said heating chamber and upper tank, a pipe connecting said header and said upper tank, a radiator extending along the bottom portion of said container and within said container and joining said header and said heating chamber, and means for passing vapor from said upper tank into the interior of said container.

2. A food cart comprising a portable box-like container having an open interior, supporting members adapted to receive food, a heating chamber and a header arranged in spaced relation adjacent the lower portion of said container, an upper tank, a riser connecting said heating chamber and said upper tank, a return pipe connecting said header and said upper tank, said riser and said return pipe being in spaced relation adjacent one end of said upper tank, a baffle plate located between the entrance of said riser and said return pipe and carried within said upper tank and terminating short of the opposite end of said tank from that connected with said riser and return pipe, a radiator connecting said header and said heating chamber, and a vapor discharge device communicating with the interior of said container and with said upper tank.

3. A food cart comprising a box-like container, supporting means therein for carrying material, a heating chamber located adjacent one end of said container, a header located adjacent the other end of said container, said header and heating chamber being positioned adjacent the bottom of said container, a radiator joining said header and heating chamber, an upper tank provided with a baffle plate terminating short of its rear end, pipes connecting the upper tank on opposite sides of the baffle plate with said heating chamber and said header, a humidifying chamber communicating with the upper portion of said upper tank and having an upwardly extending baffle plate, said humidifier chamber having a projecting portion extending inwardly into said container and having a passageway communicating with said humidifying chamber and the interior of said container.

4. A food cart comprising a container adapted to receive food, a heating system comprising a heating chamber and a heater arranged in spaced relation and connected by means of a radiator, an upper tank having pipes leading to said heating element and said header, a humidifying chamber having a fitting projecting into said container and communicating with said upper tank and with the interior of said chamber by two distinct passageways, said humidifying chamber having an upwardly extending baffle spaced from the upper portion of said chamber and positioned between said passageways.

5. A food cart comprising a container adapted to receive food, a heating system comprising a heating chamber and a header arranged in spaced relation and connected by means of a radiator, an upper tank having pipes leading to said heating chamber and said header, a humidifying chamber having a fitting projecting into said container and communicating with said upper tank and with the interior of said chamber by two distinct passageways, said humidifying chamber having an upwardly extending baffle spaced from the upper portion of said chamber and positioned between said passageways, said humidifying chamber having a pipe leading downwardly and entering said header.

In testimony that I claim the foregoing I have hereunto set my hand at Milwaukee, in the county of Milwaukee and State of Wisconsin.

GEORGE A. LUECK.